United States Patent Office 2,742,464
Patented Apr. 17, 1956

2,742,464

PRODUCTION OF CAPILLARY ACTIVE AMINE-AMIDES

Adolf Koebner, Davyhulme, Urmston, and Edwin Marshall Meade, Bollington, near Altrincham, England No Drawing. Application April 25, 1951,
Serial No. 222,928

7 Claims. (Cl. 260—247.2)

This invention relates to improved methods for the production of amine-amides and to certain novel amine-amides produced thereby.

Capillary active cationic agents have found use in various industrial fields. Among other things they have been used as finishing agents for textiles, for precipitating and fixing pigments on textiles, for breaking petroleum emulsions, for discharging negatively charged particles in separatory or filtration processes, and as bacteriostatic and bacteriocidal agents. Heretofore the bulk of the commercially produced cationic agents have been long chain alkyl ammonium salts such as lauryl benzyl dimethyl ammonium chloride. However, among the cationic agents available are a limited class of amine-amides derived from higher molecular weight aliphatic or aliphatic-aromatic acids, for example, oleoyl aminoethyl diethylamino methosulfate. Generally speaking, such amine-amides have been prepared by condensing a carboxylic acid halide, and the like with asymmetrically substituted polyamines. For instance, oleoyl aminoethyl diethylamine methosulfate is derived from oleic acid and diethylaminoethyl amine. Among other things, such a process is lacking in flexibility due to the very limited number of commercially available asymmetrically substituted polyamines.

It is a principal object of this invention to provide a very simple method for preparing capillary active cationic amine-amides.

It is another object of this invention to provide a method for preparing capillary active amine-amides without the necessity for using difficultly prepared intermediates.

It is a further object of this invention to provide a method for preparing valuable capillary active amine-amides at mildly elevated temperatures and at atmospheric pressures or without the necessity for using pressure vessels.

It is a special object of this invention to provide a very flexible process for producing surface active amine-amides adapted for the production of any desired type of amine radicals varying from primary amine compounds to quaternary ammonium compounds.

It is an additional object of this invention to provide a method for producing surface active amine-amides in high yields.

It is another special object of this invention to produce new classes of and certain specific surface active amine-amides.

It is a further special object of this invention to provide a method for producing surface active amine-amides containing heterocyclic amines such as those derived from pyridine or morpholine.

Other objects, features and advantages of this invention will be apparent from the more detailed description which follows.

In accordance with this invention a wide variety of valuable capillary active amine-amides are produced by condensing an amide of an organic carboxylic acid containing from nine to twenty-one carbon atoms in its acyl radical and containing a β-hydroxy aliphatic substituent on its amide nitrogen atom with a phosphorus halide or a sulfur oxy-halide and with an amine-forming compound including primary amines, secondary amines, tertiary amines, ammonia or ammonia delivering compounds. The condensations and reactions of this invention take place under very mild heating and without the necessity for using pressure vessels. Normally, temperatures below 140° C. are adequate and most condensations take place readily at 130° C. or below, as at temperatures of 100° C. to 120° C.

The amides used in the condensation reactions of this invention may be prepared by known methods, such as that disclosed in British Patent 631,367 or by the reaction of carboxylic acids with appropriate amines or by the reaction of amides with appropriate alkylene oxides and the like. The acids from which the amides are derived may be known cyclic or acyclic high molecular weight carboxylic acids having a sufficiently large hydrophobic molecular component to produce the desired surface activity and include such acids as aliphatic or aromatic-aliphatic carboxylic acids containing nine to twenty-one carbon atoms. Especially valuable products are derived from high molecular weight fatty acids. The amide component is derived from β-hydroxy aliphatic primary or secondary amines. Suitable primary amines readily available commercially include monoethanolamine, monopropanol amine, monobutanolamine and β-hydroxy, β-phenyl ethylamine. Presently commercially available β-hydroxy aliphatic secondary amines include such compounds as methyl ethanol amine, ethyl ethanol amine, and diethanol amine.

The halogenated amine radical of this invention may be derived from a great variety of known primary, secondary, or tertiary amines or from ammonia or compounds yielding ammonia such as urea or hexamethylene tetramine or the like. The flexibility of the process of this invention is apparent from the fact that halides of primary amines may be produced from ammonia or ammonia delivering compounds, secondary amine halides from primary amines, tertiary amine halides from secondary amines, and quaternary ammonium halides from tertiary amines.

By known methods the corresponding base may be separated or isolated from the halide salt, and salts of the base with other acids readily prepared. Likewise, by known methods, the halide may be replaced by other salt-forming radicals.

Thus the process of this invention provides a method for producing salts of the general formula:

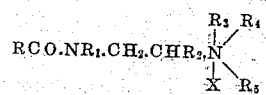

wherein R is a saturated or unsaturated cyclic or acyclic hydrocarbon radical containing 8 to 20 carbon atoms; $R_1$ and $R_2$ are H or a substituted or unsubstituted hydrocarbon radical, advantageously an alkyl radical; $R_3$, $R_4$ and $R_5$ are the same or different and represent H or substituted or unsubstituted hydrocarbon radicals, advantageously substituted or unsubstituted alkyl radicals; $R_3$, $R_4$ and $R_5$ may conjointly represent a heterocyclic secondary or tertiary nitrogen base such as pyridine, morpholine or nicotine, and X is a halide or other anion.

The high yields and purity of the products of the process of this invention have been determined by surface active titration as disclosed by T. Barr et al. in his article "The determination of surface active agents in solution" in Society of Chemical Industry Journal, vol. 67, February 1948, pp. 45–48. The technique has been modified so that in the titration the dye passes from the aqueous to the chloroform phase. In the titration, pure recrystallized sodium dodecyl sulfate and a methylene blue solution (0.04% in 20% alcohol) were used as reagents. An M/1000 solution of the sodium dodecyl sulfate was made (0.288 gram per liter). Also a suitable quantity of the substance being tested was likewise weighed and water added to give about 1 liter of the solution thereby forming approximately an M/1000 solution. A preliminary rough estimate may be necessary to ascertain the appropriate weight of substance to be used. Ten mls. of this solution was transferred by pipette to a 50 ml. stoppered bottle and 1 ml. of $$\frac{N}{2}$$

HCl, 20 mls. of CH₃Cl and 4 drops of methylene blue solution were added. The solution was then titrated with an M/1000 sodium dodecyl sulfate solution under vigorous shaking until the aqueous layer was completely colorless. The approach of the complete disappearance of color was indicated by the rapidity of the separation of the two layers after shaking. At the completion of the titration both layers separated bright and clear. The titration was sensitive to about 0.2 ml. in an M/1000 solution.

Complementary discussions of surface active titrations will be found in the following articles.

Association of Official Agricultural Chemists Journal, vol. 28, 1945. "General colorimetric method for determination of small quantities of sulfonated or sulfated surface active compounds" by J. H. Jones, pp. 398–409.

Industrial and Engineering Chemistry (Analytical Edition), vol. 15, 1943 (July–December). "Germicidal quaternary ammonium salts in dilute solution" by M. E. Auerbach, pp. 492–493.

Industrial and Engineering Chemistry (Analytical Edition), vol. 16, 1944 (July–December). "Colorimetric assay of quaternary ammonium salts" by M. E. Auerbach, p. 739.

Royal Society of London Proceedings, vol. 168, Series A (Mathematical and Physical Sciences), November 7, 1938. "Determination of the paraffin-chain radical" by G. S. Hartley and D. F. Runnicles, pp. 424–425.

The Journal of the Society of Dyers and Colourists, vol. 61, July, 1945. "Tensimetric analysis of surface-active electrolytes" by J. M. Preston, pp. 165–166.

The following examples in which the yields were determined by surface active titration as described herein further illustrate the practice of our invention.

*Example 1*

Two hundred and thirty-four parts of β-hydroxy ethyl lauramide prepared according to British Patent No. 631,367 are warmed to 60° C. and 46 parts of phosphorus trichloride are gradually mixed. The reaction is mildly exothermic, and gentle cooling may be applied. Then 79 parts of pyridine are added to the mixture and the mixture is heated to 120° C. and maintained at about 120° C. for two hours. As the reaction proceeds the quaternary salt forms and the mixture sets to a viscous mass. The reaction product may be purified by crystallization from alcohol/ether mixtures. The product is readily soluble in water, alcohol and similar polar solvents.

The yield of commercial lauroyl aminoethyl pyridinium chloride, having the formula

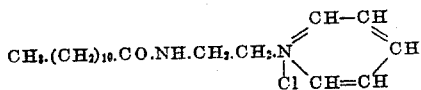

was 90% of the theoretical amount.

*Example 2*

While keeping the temperature below 50° by external cooling, 119 parts of thionylchloride are gradually introduced into 339 parts of N methyl N-β-hydroxy ethyl oleoylamide, prepared by conventional methods or by the process of amidation outlined in British Patent No. 631,367. Then 87 parts of morpholine are introduced and the mixture is heated to 130° C. and maintained at about 130° C. for one and a half hours. The viscous reaction product is clearly soluble in water, but the free base may be precipitated from the solution by the addition of alkali. By treatment of the tertiary base thus obtained with dimethyl or diethyl sulphate, benzyl chloride or other alkyl halides, the tertiary base may be converted to a quaternary salt.

The yield of commercial oleoyl N.methyl N.ethyl morpholinium hydrochloride having the formula

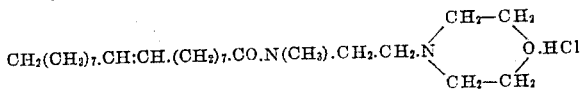

was 70% of the theoretical amount.

*Example 3*

Ninety-three parts of phosphorous tribromide are gradually added at 40° C. to a solution of 341 parts β-hydroxy propylstearamide (prepared from hardened whale oil and mono-isopropanolamine by the process of catalytic amidation outlined in British Patent No. 631,367, or by conventional methods such as the condensation of stearic acid with mono-propanolamine or the condensation of stearamide with propylene oxide) in 300 parts of toluene. Then 146 parts of diethylamine are added and the mixture is heated in an autoclave to 130° C. and maintained at about 130° C. for approximately two hours. Upon cooling, crystalline diethylamine salts separate and may be removed by filtration, or washed out with water leaving the tertiary base in toluene solution. Thus diethylamine-propylstearamide may then be obtained by the distillation of the solvent.

The yield of commercial stearoyl aminoisopropyl diethylamine hydrobromide, having the formula

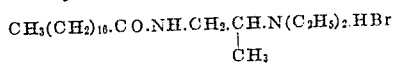

was 50% of the theoretical amount.

*Example 4*

Forty-five parts of phosphorous trichloride are added to 253 parts of mixed ethanolamides prepared from palm kernel oil by the method described in British Patent No. 631,367. A mixture of 185 parts dodecylamine and 25 parts of alcohol is then added and the reaction mass is heated under gentle reflux for three hours. The final product is freed from the solvent. It readily disperses in water to form a milky solution, from which the secondary base, a mixed acylaminoethyl dodecylamine is precipitated by the addition of alkali.

The yield of palm kernel fatty acid aminoethyl laurylamine hydrochloride, having as a principal ingredient a compound of the formula

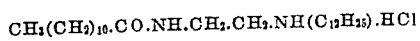

was 60% of the theoretical amount.

*Example 5*

Two hundred and fifty-three parts of the β-hydroxy ethanolamide, prepared from palm kernel oil, in 200 parts of benzene are treated with 137 parts of phosphorous triiodide, prepared in situ, from iodine and red phosphorous.

Then 79 parts of pyridine are added and the mixture is refluxed for three hours. After removal of the solvent, the pyridinium iodide is obtained as a stiff paste, which may be purified by crystallization.

The yield of palm kernel fatty acid aminoethyl pyridinium iodide, having as a principle ingredient a compound of the formula

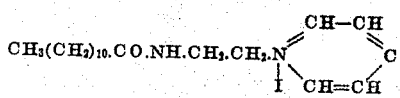

was 80% of the theoretical amount.

*Example 6*

One hundred and five parts of diethylamine are added to 253 parts of the β-hydroxy ethanolamide, prepared from coconut oil as previously described in British Patent No. 631,367 at 60° C. Then 46 parts of phosphorous trichloride are gradually introduced with external cooling, and after the addition has been completed the mixture is heated to 130° C. and maintained at about 130° C. for approximately three hours. The tertiary base obtained may be isolated from the hydrochloride in the usual manner by the addition of alkali.

The yield of coconut fatty acid amino ethyl diethylamine hydrochloride, having as a principle ingredient a compound of the formula

was 55% of the theoretical yield.

*Example 7*

Sixty parts of urea are added to a chlorinated fatty amide prepared from β-hydroxy ethyl lauramide and phosphorous trichloride as described in Example 1. Then the mixture is warmed to 130° C. and maintained at that temperature for about three hours. The aminoethyl lauramide may be isolated in the usual way from the reaction mixture.

A principal ingredient of the capillary active amine-amide is lauroyl aminoethyl amine hydrochloride having the formula

The practice of this invention has been exemplified in the specification by various details and examples. It will be understood, however, that these details may be varied widely and that substitutions, additions or omissions can be made without departing from the spirit or the scope of the invention which is intended to be defined by the appended claims.

What is claimed is:

1. A process for producing capillary active amine-amides which comprises condensing an amide of a fatty acid containing from nine to twenty-one carbon atoms in its acyl radical and containing a β-hydroxy alkanol substitutent on its amide nitrogen atom with a compound selected from the group consisting of phosphorus halides and sulfur oxyhalides, said halides being selected from the group consisting of chlorides, iodides and bromides and with a nitrogen compound selected from the group consisting of ammonia, compounds delivering ammonia at elevated temperatures, primary amines, secondary amines, and tertiary amines, said condensations with said nitrogen compound being effected by reacting under atmospheric pressure and heating to elevated temperatures in excess of 100° C. but not exceeding 140° C.

2. A process for producing capillary active amine-amides which comprises mixing an amide of a fatty acid containing from nine to twenty-one carbon atoms in its acyl radical and containing a β-hydroxy ethylol substituent on its nitrogen atom, with a compound selected from the group consisting of phosphorus halides and sulfur oxyhalides, said halides being selected from the group consisting of chlorides, iodides and bromides and with a nitrogen compound selected from the group consisting of ammonia, compounds delivering ammonia at elevated temperatures, primary amines, secondary amines, and tertiary amines, and heating the formed mixture to a temperature exceeding 100° C. but not exceeding 140° C. replacing said hydroxy substituent with a halogenated amine radical.

3. A process for producing capillary active amine-amides which comprises condensing an amide of a fatty acid containing from 9 to 21 carbon atoms in its acyl radical and containing a β-hydroxy alkanol substituent on its amide nitrogen atom with a phosphorus halide, said halide being selected from the group consisting of chlorides, iodides and bromides and with a nitrogen compound selected from the group consisting of ammonia, compounds delivering ammonia at elevated temperatures, primary amines, secondary amines and tertiary amines, said condensation with said nitrogen compound taking place respectively in approximately the molar ratios of 1:1/3:1 and being effected by reactions taking place under atmospheric pressure and heating at elevated temperatures exceeding 100° C. but not exceeding 140° C.

4. A process for producing capillary active amine-amides which comprises mixing an amide of a fatty acid containing from nine to twenty-one carbon atoms in its acyl radical and containing a β-hydroxy alkanol substituent on its nitrogen atom, with a compound selected from the group consisting of phosphorus halides and sulfur oxy-halides, said halides being selected from the group consisting of chlorides, iodides and bromides and with a cyclic nitrogen base, and heating the formed mixture to a temperature exceeding 100° C. but not exceeding 140° C. replacing said hydroxy substituent with a halogenated cyclic amine radical.

5. A process for producing capillary active amine-amides which comprises mixing an amide of a fatty acid containing from nine to twenty-one carbon atoms in its acyl radical and containing a β-hydroxy alkanol substituent on its nitrogen atom, with a compound selected from the group consisting of phosphorus halides and sulfur oxy-halides, said halides being selected from the group consisting of chlorides, iodides and bromides and with pyridine, and heating the formed mixture to a temperature exceeding 100° C. but not exceeding 140° C. replacing said hydroxy substituent with a halogenated amine radical.

6. A process for producing capillary active amine-amides which comprises mixing an amide of a fatty acid containing from nine to twenty-one carbon atoms in its acyl radical and containing a β-hydroxy alkanol substituent on its nitrogen atom, with a compound selected from the group consisting of phosphorus halides and sulfur oxy-halides, said halides being selected from the group consisting of chlorides, iodides and bromides and with morpholine, and heating the formed mixture to a temperature exceeding 100° C. but not exceeding 140° C. replacing said hydroxy substituent with a halogenated morpholinium radical.

7. A process for producing capillary active amine-amides which comprises mixing an amide of a fatty acid containing from nine to twenty-one carbon atoms in its acyl radical and containing a β-hydroxy alkanol substituent on its amine nitrogen atom with a compound selected from the group consisting of phosphorus halides and sulfur oxy-halides, said halides being selected from the group consisting of chlorides, iodides and bromides and with a tertiary amine to produce the quaternary ammonium halide, and heating the formed mixture to a temperature exceeding 100° C. but not exceeding 140° C. replacing said hydroxy substituent with a halogenated quaternary ammonium radical.

(References on following page)

References Cited in the file of this patent

UNITED STATES PATENTS

| | | |
|---|---|---|
| 1,737,458 | Hartmann et al. | Nov. 26, 1929 |
| 1,802,258 | Jaeck | Apr. 21, 1931 |
| 1,924,698 | Neelmeier et al. | Aug. 29, 1933 |
| 2,212,654 | Wirth | Aug. 27, 1940 |
| 2,242,211 | Haack | May 20, 1941 |
| 2,259,650 | Maxwell | Oct. 21, 1941 |
| 2,268,395 | Henke et al. | Dec. 30, 1941 |
| 2,282,702 | Bock | May 12, 1942 |
| 2,407,703 | Kaplan | Sept. 17, 1946 |